V. A. FYNN.
POLYPHASE COMMUTATOR MOTOR.
APPLICATION FILED JUNE 1, 1909.

960,883.

Patented June 7, 1910.

2 SHEETS—SHEET 1.

WITNESSES:
L. L. Mead.
W. H. Alexander.

INVENTOR
Valère A. Fynn
BY
Fowler & Huffman
ATTORNEYS

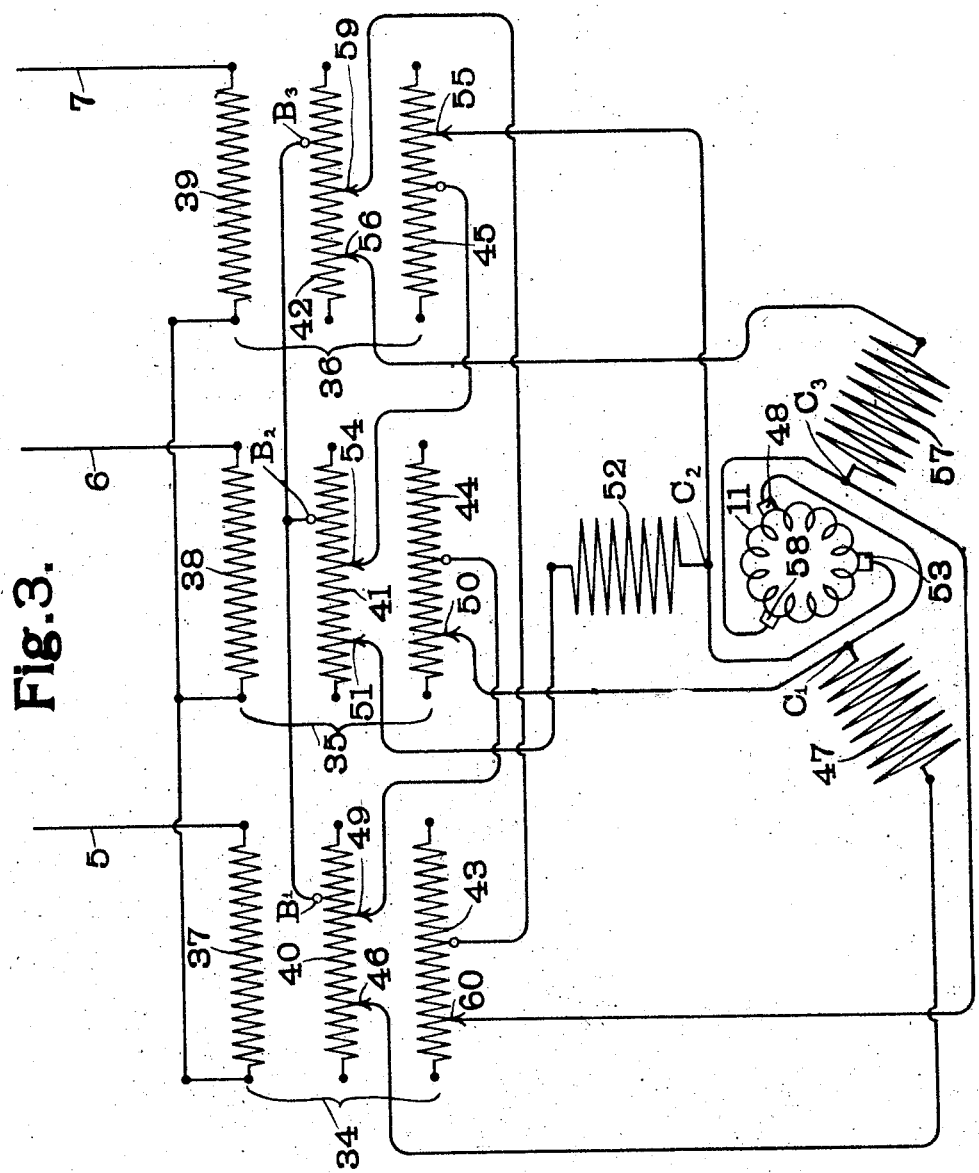

UNITED STATES PATENT OFFICE.

VALÈRE ALFRED FYNN, OF LONDON, ENGLAND.

POLYPHASE COMMUTATOR-MOTOR.

960,883.   Specification of Letters Patent.   Patented June 7, 1910.

Application filed June 1, 1909. Serial No. 499,465.

*To all whom it may concern:*

Be it known that I, VALÈRE ALFRED FYNN, a subject of the King of England, residing at London, England, have invented a certain new and useful Polyphase Commutator-Motor, of which the following is such a full, clear, and exact description as will enable anyone skilled in the art to which it appertains to make and use the same, reference being had to the accompanying drawings, forming part of this specification.

My invention relates to polyphase commutator motors with a shunt characteristic. Conduction and induction motors of said type are known and each is particularly adapted for operation at certain speeds,—thus the conduction type I find as a rule is more satisfactory in its operation when run at very low speeds and at speeds above synchronism whereas the induction type is often best at synchronism and at speeds somewhat below the synchronous.

It is the object of my invention to provide a variable speed polyphase motor capable of satisfactorily operating over a very wide range of speed.

Other objects are to control the power factor of such motors and to simplify their construction.

I achieve my first object by so constituting my motor that it can be operated either as a conduction or as an induction motor or as a combination of both types without it being necessary to change the connections or to disconnect the motor from the mains, the transition from one style of operation to any other being as gradual as may be desired. I control the power factor by combining phase compensating devices with my motor and I simplify its construction by making use of only one stator winding per phase. I utilize this stator winding as a neutralizing winding only or as a transformer winding or as a field winding or as a field and compensating winding or for two or more of these duties simultaneously, and I so arrange my circuit that the rotor winding along the corresponding axis can when desired be utilized for the same purposes.

Figure 1:
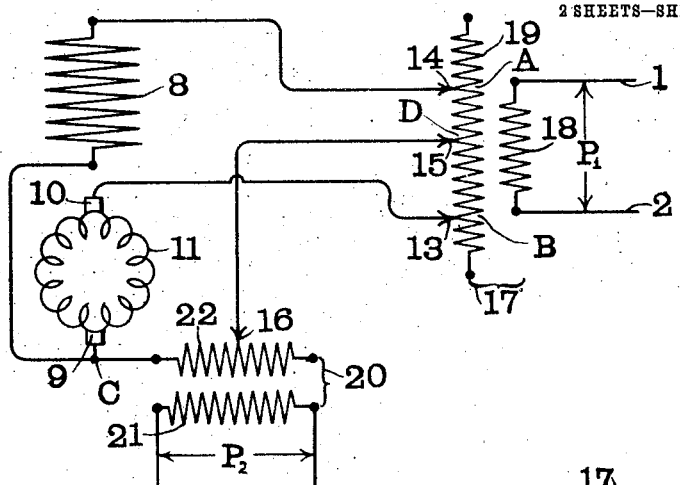
Figure 2:
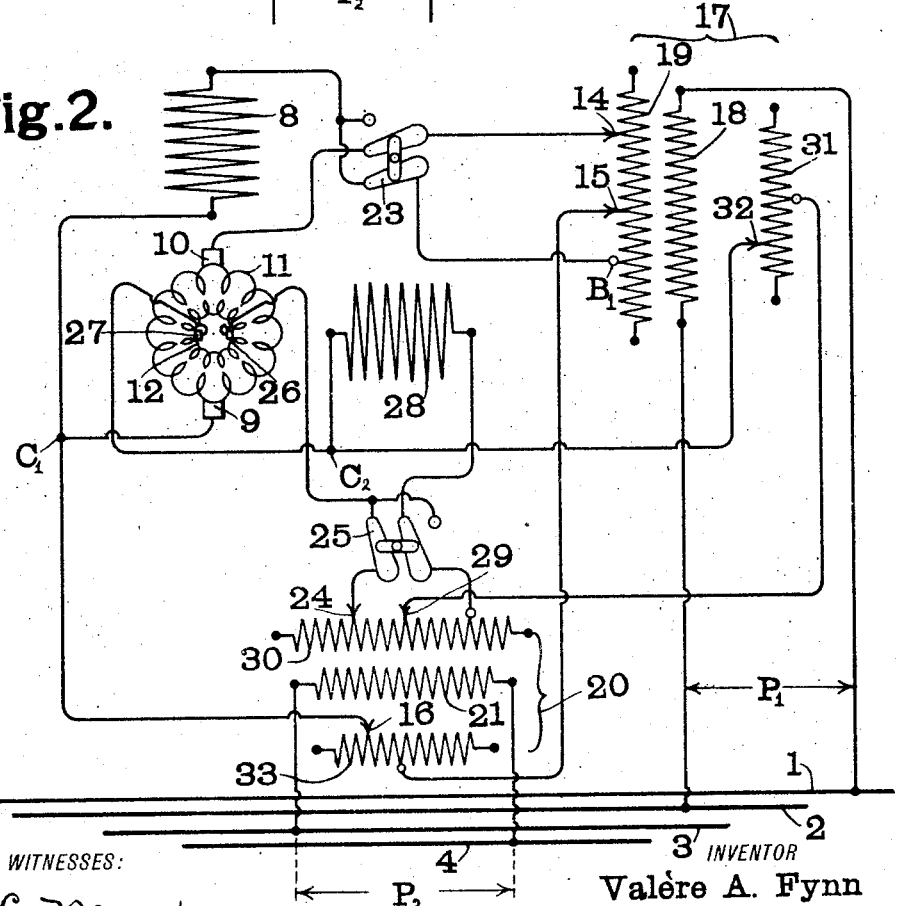

In the accompanying diagrammatic drawings, which show two-pole embodiments of my invention, Figure 1 is not an operative combination but simply illustrates the leading idea underlying the invention as applied to one motor phase only. Fig. 2 is a two-phase motor with phase compensation and adapted for speed regulation, whereas Fig. 3 shows a corresponding three-phase machine.

Referring to Fig. 1, the working circuit comprises the stator winding 8 to which I will hereinafter refer as the neutralizing winding although it does not always or exclusively act as such, and the commuted winding 11. The two are coaxially connected in series and in opposition by way of the brushes 9, 10 and an E. M. F. $P_1$ derived from the mains 1, 2 by way of the transformer 17 is impressed on this working circuit as a whole. A point C intermediately situated with respect to the two windings forming the working circuit of this phase is connected to some point D of that transformer winding 19 which feeds the working circuit and an auxiliary or compensating E. M. F. $P_2$ differing in phase from $P_1$ is impressed on the conductor connecting points D and C, or in other words, is included between D and C in the preferred form of my motor. This auxiliary E. M. F. $P_2$ may be a single E. M. F. or the resultant of a number of E. M. Fs. of differing phases. In Fig. 1 it is supposed to be derived by way of the transformer 20 from the second phase 3, 4, of a two-phase supply.

The nature of the motor, provided of course that the scheme shown in Fig. 1 is applied to a polyphase machine, will depend on the position of point D, *i. e.*, of contact 15, relatively to points A and B of 19. Thus when 15 stands at A then 8 is short-circuited or is closed on a part of 22 according to the position of contact 16. When 8 is short-circuited the machine operates as a non-compensated motor and when 8 is closed on 22 then it operates as a compensated motor. When 15 stands on B the motor operates as an induction motor and the machine is compensated or not according to whether a part of 22 is included in the brush circuit. When 15 stands approximately in the position shown in Fig. 1 then the machine operates as a neutralized conduction motor, the working circuit being supplied from the points A, B and 8 doing duty not only as a neutralizing winding but also as a field and compensating winding, the exciting E. M. F. impressed on 8 being derived from 19 and the compensating or auxiliary E. M. F. from 22. In other positions of 15 the motor operates partly as a conduction and partly as an induction motor. By suitably displacing the various contacts I can therefore not only alter the speed of my machine but also change the nature of its operation to suit the particular speed at which I choose to run it, thereby securing the most efficient operation at all points.

In the position of the contacts shown in Fig. 1 the speed may be varied by varying the E. M. F. derived from 19 for instance at 15 and impressed on the exciting circuit. This is achieved by varying the position of contact 15 relatively to the positions of contacts 13 and 14. The speed can also be varied by varying the E. M. F. derived from 19 and impressed on the working circuit as a whole. This can be achieved by moving both or either of the contacts 13 and 14. The power factor of the motor can be varied by varying the E. M. F. derived from 22 and impressed on the exciting circuit. One of the contacts 13 or 14 can be omitted.

Referring to the two-phase motor shown in Fig. 2, one of the working circuits comprises the neutralizing winding 8 and the commuted winding 11 by way of the brushes 9, 10 and is fed from the mains 1, 2 by way of the transformer 17 with its primary 18 and secondary 19. The E. M. F. impressed on this first working circuit is derived from 19 at points $B_1$ and 14. It can be regulated at 14 and reversed at 23. A point $C_1$ intermediately situated between the windings 8 and 11 is regulatably connected to some point of 19, for instance at 15, but by way of the secondary 33 of the transformer 20 fed from the phase 3, 4. The contact 15 being connected to an intermediate point of 33 it is possible by means of contact 16 not only to vary the magnitude but also the direction of the auxiliary E. M. F. derived from 33. This connection is of course equivalent in effect to a reversing switch controlling 33. The direction of the E. M. F. derived from 19 and impressed on the circuit controlled by 15 depends on whether 15 stands above or below 14 or above or below $B_1$. Similarly the second working circuit comprises the neutralizing winding 28 and the commuted winding 12 by way of the brushes 26, 27 and is fed from the mains 3, 4 by way of the transformer 20 with its primary 21 and secondary 30. The E. M. F. impressed on this second working circuit is derived from 30 at points $B_2$ and 24, it can be regulated at 24 and reversed at 25. A point $C_2$ intermediately situated between the windings 28 and 12 is regulatably connected to some point of 30 for instance at 29 but by way of the secondary 31 of the transformer 17 fed from phase 1, 2. The contact 29 being connected to an intermediate point of 31 it is possible by means of contact 32 not only to vary the magnitude but also the direction of the E. M. F. derived from 31. The direction of the E. M. F. derived from 30 and impressed on the circuit controlled by 29 depends on whether 29 stands on the left or on the right of 24 or whether it stands on the left or the right of $B_2$.

In Fig. 3 is shown an equivalent arrangement of a three-phase motor. There are three transformers 34, 35, 36 each having two secondaries 40, 43 also 41, 44 and 42, 45. These transformers are grouped in star connection. The working circuits of the motor are also star connected, the neutral point lying within the single commuted winding 11 disposed on the rotor. The three neutralizing windings 47, 52, 57 are coaxially and oppositely connected to the commuted winding by way of the brushes 48, 53 and 58 respectively. The E. M. Fs. impressed on each of the three working circuits as a whole are derived from the secondaries 40, 41 and 42 respectively and depend for their magnitude on the relative positions of contact 46 and point $B_1$, of contact 51 and point $B_2$ and of contact 56 and point $B_3$. Intermediate points $C_1$, $C_2$, $C_3$, of the three working circuits are also regulatably connected to these secondaries 40, 41, 42 at 49, 54 and 59 but by way respectively of the secondaries 44 with contact 50, of 45 with contact 55 and of 43 with contact 60.

The direction of rotation in any of these motors is reversed in the usual manner by reversing the direction of the working current relatively to that of the motor field.

Having fully described my invention, what I claim as new and desire to secure by Letters Patent of the United States is:

1. In a polyphase motor, at least two working circuits each containing a neutralizing winding on the stationary member and a commuted winding on the revolving member, said windings being coaxially connected in series relation, a separate shunt transformer for connecting each of said working circuits to the source of supply, and a separate conductor for each working circuit connecting the transformer feeding said circuit to a point on that circuit situated between the neutralizing winding and the commuted winding.

2. In a polyphase motor, at least two working circuits each containing a neutralizing winding on the stationary member and a commuted winding on the revolving member, said windings being coaxially connected in series relation, a separate adjustable ratio shunt transformer for connecting each of said working circuits to the source of supply, and a separate conductor for each working circuit connecting the transformer feeding said circuit to a point on that circuit situated between the neutralizing winding and the commuted winding.

3. In a polyphase motor, at least two working circuits each containing a neutralizing winding on the stationary member and a commuted winding on the revolving member, said windings being coaxially connected in series relation, a separate adjustable ratio shunt transformer for connecting each of said working circuits to the source of supply, and a separate conductor for each working circuit provided with a movable contact and connecting the transformer feeding said circuit to a point on that circuit situated between the neutralizing winding and the commuted winding.

4. In a polyphase motor, a working circuit for each phase containing a neutralizing winding on the stationary member and a commuted winding on the revolving member, said windings being coaxially connected in series relation and in opposition to each other, a shunt transformer, the secondary winding of said transformer being provided with movable contacts for connecting it to the working circuit, a conductor connecting a point on the working circuit situated between the neutralizing winding and the commuted winding to one of said movable contacts, and means for impressing on a part of the working circuit an auxiliary E. M. F.
differing in phase from the E. M. F. impressed on the working circuit as a whole.

5. In a polyphase motor, a working circuit for each phase containing a neutralizing winding on the stationary member and a commuted winding on the revolving member, said windings being coaxially connected in series relation and in opposition to each other, a shunt transformer, the secondary winding of said transformer being provided with movable contacts for connecting it to the working circuit, a conductor connecting a point on the working circuit situated between the neutralizing winding and the commuted winding to one of said movable contacts, and means for impressing on a part of the working circuit an auxiliary E. M. F. approximately in phase quadrature to the E. M. F. impressed on the working circuit as a whole.

6. In a polyphase motor, a working circuit for each phase containing a neutralizing winding on the stationary member and a commuted winding on the revolving member, said windings being coaxially connected in series relation and in opposition to each other, a shunt transformer, the secondary winding of said transformer being provided with movable contacts for connecting it to the working circuit, a conductor con-
necting a point on the working circuit situated between the neutralizing winding and the commuted winding to one of said movable contacts, and a second transformer for impressing on said conductor an auxiliary E. M. F. differing in phase from the E. M. F. impressed on the working circuit as a whole.

7. In a polyphase motor, a working circuit for each phase containing a neutralizing winding on the stationary member and a commuted winding on the revolving member, said windings being coaxially connected in series relation and in opposition to each other, a shunt transformer for connecting said working circuit to the source of supply, a conductor connecting the winding of the transformer to which the working circuit is connected, to a point on that circuit situated between the neutralizing winding and the commuted winding, and means for impressing on part of the working circuit an auxiliary E. M. F. differing in phase from the E. M. F. impressed on the working circuit as a whole.

8. In a polyphase motor, a working circuit for each phase containing a neutralizing winding on the stationary member and a commuted winding on the revolving member, said windings being coaxially connected in series relation and in opposition to each other, a shunt transformer for connecting said working circuit to the source of supply, a conductor connecting the winding of the transformer to which the working circuit is connected, to a point on that circuit situated between the neutralizing winding and the commuted winding, and means for impressing on part of the working circuit an auxiliary E M. F. approximately in phase quadrature to the E. M. F. impressed on the working circuit as a whole.

9. In a polyphase motor, a working circuit for each phase containing a neutralizing winding on the stationary member and a commuted winding on the revolving member, said windings being coaxially connected in series relation and in opposition to each other, a shunt transformer connected to the source of supply, movable contacts for connecting the working circuit to the secondary winding of said transformer, a conductor connecting said secondary transformer winding to a point on the working circuit situated between the neutralizing winding and the commuted winding, and means for impressing on a part of the working circuit an auxiliary E. M. F. differing in phase from the E. M. F. impressed on the working circuit as a whole.

10. In a polyphase motor, a working circuit for each phase containing a neutralizing winding on the stationary member and a commuted winding on the revolving member, said windings being coaxially connected in series relation and in opposition to each other, a shunt transformer connecting said working circuit to the source of supply, a conductor connecting the winding of the transformer to which the working circuit is connected, to a point on that circuit situated between the neutralizing winding and the commuted winding, and a second transformer for impressing on said conductor an auxiliary E. M. F. differing in phase from the E. M. F. impressed on the working circuit as a whole.

11. In a polyphase motor, a working circuit for each phase containing a neutralizing winding on the stationary member and a commuted winding on the revolving member, said windings being coaxially connected in series relation and in opposition to each other, a shunt transformer connected to the source of supply, movable contacts for connecting the working circuit to the secondary winding of said transformer, a conductor connecting said secondary transformer winding to a point on the working circuit situated between the neutralizing winding and the commuted winding, and a second transformer for impressing on said conductor an auxiliary E. M. F. differing in phase from the E. M. F. impressed on the working circuit as a whole.

12. In a polyphase motor, a working circuit for each phase containing a neutralizing winding on the stationary member and a commuted winding on the revolving member, said windings being coaxially connected in series relation and in opposition to each other, a shunt transformer for connecting said working circuit to the source of supply, a conductor connecting a point on the working circuit situated between the neutralizing winding and the commuted winding to the winding of the transformer to which the working circuit is connected, a second transformer for impressing on said conductor an auxiliary E. M. F. differing in phase from the E. M. F. impressed on the working circuit as a whole, and means for varying the magnitude of said auxiliary E. M. F.

In testimony whereof I have hereunto set my hand and affixed my seal in the presence of the two subscribing witnesses.

VALÈRE ALFRED FYNN. [L. S.]

Witnesses:
 ELIZABETH BAILEY,
 E. E. HUFFMAN.